Patented Jan. 12, 1943

2,307,860

UNITED STATES PATENT OFFICE

2,307,860

COMPOSITION MATERIAL AND METHOD OF PRODUCING THE SAME

Charles H. Schuh, Ridgewood, N. Y., assignor, by mesne assignments, to Carbide and Carbon Chemicals Corporation, New York, N. Y., a corporation of New York No Drawing. Application May 2, 1939, Serial No. 271,352

7 Claims. (Cl. 260—750)

This invention relates to cork bark dust composition, in particular to insulation material, compressed fibrous products and artificial leather compositions comprising such material and to methods of making the same.

The present invention is a continuation-in-part of my copending application Serial No. 179,867, filed December 15, 1937, which is a division of my copending application Serial No. 46,742, filed October 25, 1935, now Patent No. 2,156,309, issued May 2, 1939.

The material, which is an outstanding feature of this invention and which is hereafter in the description and claims referred to as cork bark dust, comprises a reddish brown powder-like particulate substance having a density of about 20 to 24 pounds per cubic foot. This material is now a waste product of the cork industry and is sometimes referred to simply as dust. The material originates principally from the exterior portion of the cork bark, which gives it the reddish brown color. It contains some fine particles of natural cork wood, as well as some foreign matter such as sand, etc., which gets lodged in the crevices of the bark. Cork bark dust, taken as a whole, is entirely different from finely powdered or ground natural cork such as is used, for instance, in thhe making of linoleum. There is a vast difference in the density, color, and the physical and chemical properties of these two materials. In fact, the difference is so pronounced that cork bark dust is at present valueless, whereas finely ground natural cork has considerable value.

So far as I am aware, no profitable use has been found for this cork bark dust and the material is at present entirely a waste product and a nuisance around the cork factory. The material is difficult to store as it rots the bags in which it is kept, and since it does not burn readily it may not be burned for fuel and its disposal, therefore, involves considerable expense.

An object of the present invention is to utilize cork bark waste in various compositions to improve their characteristics and provide new and additional ones.

A further object is to provide a compressed fibrous insulation product with improved fire resistant qualities by the use of cork bark dust.

Another object is to provide artificial leather compositions with a realistic leather-like color and appearance.

Still another object of the invention is to provide a pleasing appearing facing comprising cork bark dust for acoustical and wall tile slabe.

Another object of the invention is to provide a flexible leather substitute or flooring comprising cork bark dust and a flexible binder, the product possessing considerable frictional resistance and a leather-like texture and feel.

A further object of the invention is to provide a compressed composition of substantially uniform physical character comprising particles of cork bark dust and a fibrous material obtained by finely beating a fibrous material, for instance, cellulose fiber, in an aqueous mixture thereof of at least 90% dilution to individualized fibers having an average length less than about 0.08" and to a non-settling volume density (dry weight) of the fiber of less than about one pound per cubic foot; the said particles and fiber being in substantially uniform volumetric distribution, and the fiber lying in substantially all directions and presenting with the cork bark dust particles a bonded composition substantially free of parallel matting of the fiber into planes of cleavage, the fiber arrangement being such that the composition has a microcellular structure comprising a multiplicity of substantially uniformly distributed, substantially fine, microscopic voids constituting at least 40% of the volume of the composition.

A further object is to provide a fiber cork bark dust microcellular structure, a cross section of which, whether taken longitudinally or either way transversely, is substantially the same in character and appearance.

Another object is to provide a flexible composition having considerable strength and low density, comprising cork bark dust and a rubber compound, for instance, latex.

I have discovered that cork bark dust may be usefully employed with surprising results in various compositions. Thus, for example, I have found that this material is easier to handle in wet processes than natural cork material, and may be used alone or as an aggregate with such material to advantage. Moreover, I have found that products made with cork bark dust have substantially greater fire resistance than products made with natural cork, and may therefore be used alone or as an aggregate for such purpose. A further and valuable discovery has been the applicability of cork bark dust to obtaining a leather-like color and appearance in various compositions, for instance, in compressed fibrous compositions. Moreover, this substance produces such effect without the use of any dyes or other chemical agents, and may be made to contribute considerable frictional resistance to the product, of which it is a part, and a leather-like texture and feel.

These advantages are of considerable importance in certain artificial leather products, as may be appreciated from the fact that a leather-like appearance has been much sought after in artificial leather compositions. For instance, in U. S. Patent No. 2,128,965, the use of phosphoric and oxalic acids is described for producing a more leather-like appearance of an artificial leatherboard. Also, in U. S. Patent No. 1,923,622, there is described the use of a vegetable tanning agent and waste sulphite liquor in a latex bonded fiber composition to be used for artificial leather. These chemical methods obviously increase the cost of the finished product, whereas the use of cork bark dust actually decreases its cost. Moreover, I have found that a considerable percentage of this material can be incorporated into the composition without producing excessive density or weight, and without any other disadvantageous results. The aforesaid advantages are also of importance in the making of wall tiles and flooring. The cork bark dust, for example, makes a very satisfactory facing for acoustical tile and wall material, as it is capable of providing a very fine texture and pleasing color. For example, it may make a splendid facing for a base of the various materials, for instance, regranulated cork disclosed and processed in accordance with the teachings of my copending applications aforesaid.

According to my preferred procedure for making products with cork bark dust, I may prepare an aqueous dispersion comprising the finely powdered cork bark dust and a medium of extension and filter aid, for instance, a finely pulped fibrous material such as finely pulped newspaper or wood pulp in the form of finely divided, individualized fibers that will provide an abnormally large non-settling volume of precipitated substance, and subject such a slurry to filtration and a desired pressure to form a matrix of large volume, which may start as low as four pounds per cubic foot density (dry weight), and which, when dry, has the particles of cork bark dust and fiber in substantially uniform volumetric distribution with the fibers lying in substantially all directions and presenting, with the cork bark dust particles, a continuous bonded composition substantially free of parallel matting of the fiber into planes of cleavage so as to produce a substantially uniform physical structure that is microcellular due to the arrangement of fiber and particles, and that comprises a multiplicity of substantially microscopic voids having substantially uniform volumetric distribution and constituting at least about 40% of the volume of the composition.

The uniformity of the structure will be readily recognized when a section of the dried matrix is cut longitudinally or either way transversely thereof. All will have a substantially similar appearance and fine grain structure without planes of cleavage. The individual fibers of the aforesaid finely pulped fiber should have an average length less than about 0.08" and should be sufficiently beaten in an aqueous mixture thereof of at least 90% dilution to give an abnormally large non-settling volume of fiber. A fiber volume having a density less than about one pound per cubic foot (dry weight) has been found generally satisfactory. The fiber will also be somewhat gelatinized. It is desirable to avoid large amounts of colloidal fiber as such is detrimental to the suspension and to filtration. It will be understood that other particulate substances, for instance, those described in my copending applications aforesaid, may be used in conjunction with the particles of cork bark dust. Also, other fibrous substances, for instance, those disclosed in my aforesaid copending applications may be used in conjunction with or in place of those mentioned above. Preferably, the fibrous component will be in part or whole of cellulosic character to aid in filtration and to obtain lowest densities. The particles of cork bark dust will generally be between 50 to 300 mesh in size.

To obtain the aforesaid microcell structure, the amount of medium of extension (finely pulped fiber) should bear a certain relation to the amount of particulate substance. A simple empirical expression for this is—percent extension medium (percent of total dry weight of composition) equals 900 divided by the density of the particulate (powdered) substance. This for cork bark dust, which has a density of about 25 pounds per cubic foot, would be 36%. For several particulate substances, the amounts may be calculated upon the density of the resultant mixture. Naturally, the percentage of extension medium to be used may be varied over a small range before the desired structure will show signs of breaking down. Thus, sometimes the medium of extension is also acting as a filter aid. In general, the range of allowable variation may be expressed as follows—percent extension medium should fall between 450 divided by the density of the particulate material and 1800 divided by that density. When this allowable variation is exceeded, the breakdown in physical structure is evidenced by the formation of layers of cleavage perpendicular to the direction of compression. Likewise, a parallel matting of the material takes place similar to that found, for example, in cardboard. The greater the compression, the more serious the breakdown. Thus, again, it is important to work under the large dilution described above (greater than about 90%) and filter without disturbing the matrix, otherwise a non-uniform, weak, inferior structure is obtained, comprising large nodules of material loosely connected together with resultant cleavages around these aggregates.

The novel bonded microcell structure may be obtained with or without the use of any so-called binder substance or with the use of such a small percentage of same as to make its presence entirely unobjectionable from the standpoint of increase in density, increase in thermal conductivity, and even increase in cost. For example, latex is contemplated when the finished product is desired to have a high degree of flexibility; sodium silicate when low cost is of vital importance, and where additional stiffness is desired, appropriate resins such as rosin, shellac, gums, natural and synthetic resins may be used. For instance, I may use a ½% latex or ½% aqueous resinous dispersion with good results, and these concentrations may be increased for specific products. The use of 3% sodium silicate or glue when used herein, will, in many cases, make filtration practically impossible to carry on. It is desirable, therefore, to avoid the use of the foregoing proportion of such materials.

Where it is desirable to waterproof my products and obtain the novel waterproofing properties set forth in my aforesaid copending applications, I may, for instance, incorporate a small percentage of dispersed paraffin or any of the other waterproofing emulsions described therein, and more particularly, in my copending application Serial No. 201,082, filed April 9, 1938, now Patent No. 2,232,977, issued Feb. 25, 1941, whereby capillary action in the finished product will be entirely eliminated and the product will be rendered internally waterproof.

Compressed fibrous products aforesaid made with cork bark dust, are permanent in character, for in them the cork bark dust does not produce any deteriorating effects whatsoever. This is particularly true and important in connection with products made from an aqueous pulp suspension and which contain considerable quantities of latex or rubber as a binder, which products are especially useful for artificial leather and floor coverings. There is also no deteriorating effect on the usual type of resin binder that might be incorporated in such products.

It will be understood that various useful products using cork bark dust may be made, which do not embody the aforesaid microcell structure, by following the general procedure described with respect to said products.

The following illustrative examples are given to provide those skilled in the art with a better understanding of the invention and methods of its application.

*Example No. 1*

To about 1,000 pounds of about 1% to about 3% sodium silicate solution, about 48 pounds of newspaper are added and subjected to high speed mechanical disintegration until the average individual fiber is about or less than approximately 0.08" in length. To this medium of extension, about 62 pounds of finely powdered cork bark dust are added with high speed mixing. The mixture is run into molds which in their simplest form are rectangular boxes, the bottoms of which are filter screens of approximately 16 mesh. It is essential to fill the form quickly and agitate the mixture while still very dilute, so as to obtain a uniform suspension in the mold, and once the matrix is formed, it must not be disturbed by further mixing. This latter point is important because in filling a form with a dilute aqueous mixture, as used herein, to the depth required, a considerable washing effect is encountered, tending to disturb and wash out the matrix which is formed immediately adjacent to the filter screen during the filling process. If such local washing out is allowed to occur during filling, the slabs will have holes and regions of decreased thickness when finished, even though the slabs are apparently absolutely evenly filled at the end of the filling operation. By noting the above precaution, an even and uniform slab can be made.

After the major portion of the liquid has filtered off, a cover made of 16 mesh screening and fitting accurately inside the mold, is placed on the material and a slight pressure is applied. It has been found that a pressure of 5 to 20 pounds per square inch, is sufficient to obtain slabs which, when dry, will have a density of approximately 12 to 20 pounds per cubic foot. The slabs are then removed from the forms by inverting them onto another screen and are placed in a dryer. The filtrate is, of course, recovered and used for subsequent batches. The dried material will have a thermal conductivity of approximately 0.29 to 0.35 B. t. u./hr./sq. ft./inch thickness. The tensile strength is approximately 150 to 400 pounds per square inch. This makes an excellent low cost building board, for instance, boards ½" to 1" thick.

*Example No. 2*

About 30 pounds of news stock are finely pulped in a beater with about 700 pounds of water. Then, about 20 pounds of long fibrous material, which may comprise cotton, wool, sisal, hemp, ramie, Cotine, leather scrap, etc., is added, and pulping is continued only sufficiently to individualize and distribute the long fibers but not to cut them up. About 50 pounds of cork dust are then added, and finally about 300 pounds of 60% Vultex solution, properly compounded. This gives about a 20% rubber dispersion. "Vultex" is the name of a proprietary product which is rubber latex vulcanized in liquid form. The intimately mixed pulp is then run through a board forming machine of the cylinder type, the filtrate being, of course, recovered for further use. The board may then be rolled or pressed, depending upon the desired finished density, and is finally dried. Generally, about 40 to 80 pounds per square inch pressure will suffice. The finished board will have a leather-like color and general appearance. At densities of about between 36 to 48 pounds per cubic foot, the material will be found useful as a low cost artificial leather substitute for soles or inner soles. It takes the stitch and cuts very well, characteristics in which artificial leathers are often found lacking. The material may be used for heels when more highly compressed to, say, about 40 to 60 pounds per cubic foot density. Short fiber may be entirely used in this example where heel products alone are to be made and lowest densities therefore are desired. The sole material will generally be made from ⅛" to $\frac{3}{16}$" thick, and the heel material about ¼" to ½" thick, or a full heel may be molded to finished form.

*Example No. 3*

The procedure in this case is similar to that used in Example No. 2, but all short finely pulped fiber is used here, and a higher finishing pressure. About 40 pounds of news stock are used, 60 pounds of cork bark dust, and about 300 pounds of 30% Vultex, or 30% compounded latex, with a finishing pressure of 50 to 100 pounds per square inch. The finished material is made somewhat thicker, about ¼" to about ½". The finished dried material may be cut into tile which will be found very useful for flooring purposes. It may be sanded to a smooth, soft surface which has a good natural color. The color is somewhat lighter than baked corkboard tile. It is soft, resilient, and has considerable frictional grip so as not to be slippery. The surface may be lacquered, if desired, and the tile may be waterproofed throughout by the addition of a paraffin emulsion to the composition, as described in my copending application Serial No. 201,082. The addition of natural or synthetic resins to the composition, while increasing the cost, will improve the toughness and wearing qualities of the product. Vultex is a vulcanized latex material. By compounded Vultex, I mean Vultex to which is added various chemical antioxidants and sulphur compounds. By compounded latex, I mean latex including vulcanizing agents, sulphur compounds, and anti-oxidants.

From the foregoing description of my invention and the several exemplified embodiments, it will be evident that I have provided novel methods for utilizing cork bark dust and products employing the same to obtain the features hereinabove mentioned. It will be evident that numerous variations in the process of manufacture, as well as the addition of other ingredients, may be made, and others will naturally suggest themselves to those skilled in the art, as a result of the general useful applicability of cork bark dust as aforesaid, all without departing from the spirit and scope of my invention, which is to be constructed as broadly as the following claims when taken in view of the prior art, may allow.

I claim:

1. A compressed composition comprising at least 30% cork bark dust, at least 10% fiber, and at least 20% binder.

2. A compressed fibrous composition comprising fiber, cork bark dust, latex and dispersed paraffin.

3. A light weight compressed composition adapted for insulation, comprising 1% to 3% soluble silicate, particles of cork bark dust in the order of about 60% of the total dry weight of the composition, exclusive of the binder, and the remainder comprising finely divided fibrous material in the form of individual fibers of an average length less than about 0.08 inches; said particles and fibers being in substantially uniform volumetric distribution, with said fibers arranged in substantially all directions, and said particles, fibers and binder presenting a continuous bonded structure that is microcellular, and comprises a multiplicity of substantially uniformly distributed substantially microscopic voids, said composition having a density in the order of about 12 to 20 pounds per cubic foot, a thermal conductivity in the order of about 0.29 to 0.35 B. t. u./hr./sq. ft./inch thickness, and a tensile strength in the order of about 150 to 400 pounds per square inch.

4. A compressed composition adapted for use as a leather substitute or flooring, comprising at least 15% of rubber derived from latex, particles of cork bark dust in the order of about 45% total dry weight of the composition exclusive of the binder, and the remainder comprising finely divided fibrous material in the form of individual fibers of an average length less than about 0.08 inch; said particles and fibers being in substantially uniform volumetric distribution, with said fibers arranged in substantially all directions, and said particles, fibers, and binder presenting a continuous bonded structure that is microcellular, and comprises a multiplicity of substantially uniformly distributed substantially microscopic voids, said composition having a strong, flexible, physically uniform structure, and a fine texture substantially free of voids of visible size.

5. A compressed composition comprising about 30 parts of news stock, about 20 parts long fiber, about 50 parts cork bark dust, and at least 15 parts rubber.

6. A light weight compressed composition comprising about 40 parts finely beaten news stock, about 60 parts cork bark dust, at least 5 parts of binder, and at least 1 part of waterproofing agent.

7. A compressed composition comprising at least about 30% cork bark dust, at least about 10% fiber and at least about 20% binder comprising synthetic resin.

CHARLES H. SCHUH.